(12) United States Patent
Burkert

(10) Patent No.: US 6,264,421 B1
(45) Date of Patent: Jul. 24, 2001

(54) APPARATUS FOR PALLETIZING CONTAINERS ON A LOAD CARRIER AND/OR DEPALLETIZING CONTAINERS

(75) Inventor: Ulrich Burkert, Vlotho (DE)

(73) Assignee: GEA Till GmbH & Co., Kriftel (DE)

( * ) Notice: Subject to any disclaimer, the term of this patent is extended or adjusted under 35 U.S.C. 154(b) by 0 days.

(21) Appl. No.: 09/462,120
(22) PCT Filed: Jun. 29, 1998
(86) PCT No.: PCT/EP98/03958
    § 371 Date: Apr. 7, 2000
    § 102(e) Date: Apr. 7, 2000
(87) PCT Pub. No.: WO99/01362
    PCT Pub. Date: Jan. 14, 1999

(30) Foreign Application Priority Data

Jul. 3, 1997 (DE) .............................................. 197 28 363
Nov. 22, 1997 (DE) .............................................. 197 51 826

(51) Int. Cl.⁷ ................................................... B65G 60/00
(52) U.S. Cl. ..................................... 414/791.6; 414/791.7; 414/793; 414/796.2; 414/796.9; 414/927; 414/929
(58) Field of Search .............................. 414/791.6, 791.7, 414/793, 796.2, 796.9, 797, 927, 928, 929

(56) References Cited

U.S. PATENT DOCUMENTS 3,934,713 * 1/1976 Van der Meer et al. ..... 414/791.7 X
4,316,693 * 2/1982 Baxter et al. ..................... 414/791.7
5,636,966 * 6/1997 Lyon et al. ......................... 414/791.6

FOREIGN PATENT DOCUMENTS 385 455 * 9/1990 (EP) .
2 514 735 * 4/1983 (FR) .

* cited by examiner

Primary Examiner—Janice L. Krizek
(74) Attorney, Agent, or Firm—Alix, Yale & Ristas, LLP

(57) ABSTRACT

The invention relates to a method for palletizing packing drums (7) on a load platform (P), especially barrels, kegs or the like in substantially cylindrical or barrel-shaped receptacles, and/or for depalletizing the packing drums. The inventive method provides as high turnover speed as possible for a layer of, for instance, six or eight packing drums (7*) without causing problems related to the inertia of masses and oscillating phenomena limiting turnover speed. This is achieved by vertically lifting each respective layer (7*) of packing drums in relation to a direct or indirect carrier contact surface (A1, A2) to the packing drum layer during transfer to or from a palet (P). The packing drum layer and the pallet are placed separately from each other (palletizing) or together (depalletizing) in a continuously identical receiving and lift movement position (G) by displacing their contact surface on a plane on which the lift movement is vertically performed. A first embodiment of the device for implementing the method has, inter alia, a stationary palletization base frame (1) with a device (2) for receiving, stopping, lifting or lowering the layer of packing drums (7*), in addition to a dual movable carriage (3, 3.1, 3.2) which can run through the palletization base frame (1) in two alternative positions on rails (8), which are perpendicular to three conveyor systems (4, 5, 6).

2 Claims, 2 Drawing Sheets

APPARATUS FOR PALLETIZING CONTAINERS ON A LOAD CARRIER AND/OR DEPALLETIZING CONTAINERS

CROSS-REFERENCE TO RELATED APPLICATION

This is the national phase of International Application No. PCT/EP98/03958 filed Jun. 29, 1998.

BACKGROUND OF THE INVENTION

The invention relates to a process for palletizing containers, in particular drums, kegs, or other essentially cylindrical or barrel-shaped containers, on a load carrier and/or depalletizing said containers in which, when the filled containers and load carriers are palletized, the pallets are supplied via a transport system and the containers are gripped together as a container layer—in the form of a group of six or eight containers in an orderly arrangement—lowered onto the pallet, and the pallets containing the filled containers are taken away via a transport system, and upon depalletizing, the pallets containing a layer of empty containers are supplied via a transport system, the layer of containers is gripped as a group, removed from the pallet, and the empty containers and pallets are taken away separately from each other by means of appurtenant transport systems, as well as an apparatus to perform the process of palletizing and/or depalletizing.

In processes and apparatuses of the defined type, it has previously been the practice to move the individual containers or a plurality of containers arranged in an orderly pattern in a so-called container layer—in other words, in the gripped and restrained condition—not only in the vertical direction but also in the horizontal direction, either at the same time or consecutively. The transfer velocity and hence the rate of transfer is limited due to the need to limit mass inertia forces and to prevent the container layers—the drums or kegs, for example—from vibrating. These layers preferably are gripped simultaneously in a six- or eight-container arrangement.

The object of the present invention is to create a process of the type defined above as well as an apparatus for performing said process characterized by achieving the greatest possible container layer transfer velocity without causing problems due to mass inertia forces and vibration effects, which would limit the transfer rate.

SUMMARY OF THE INVENTION

The general principle of the invention therefore is that during palletizing, the given container layer is moved when it is transferred to or from the pallet exclusively by a lifting motion in a vertical orientation relative to the carrying surface that directly or indirectly bears the layer of containers. In this motion, the container layer and the pallet are brought—separately from one another (palletizing) or together (depalletizing) to the same gripping and lift position for the lifting motion by moving their carrying surface in a plane normal to the lifting motion. Depalletizing takes place mutatis mutandis in the reverse order, and the palletizing and depalletizing operations can also be performed in alternation.

The apparatus for performing the process is essentially characterized by the fact that a container layer is transported beneath a stationary gripping, restraining, and lifting system, by which it is gripped, restrained, and lifted in a vertical direction only, and that when the container layer is subsequently lowered in a vertical direction, it is placed on an empty pallet which in the intervening time has been transported beneath the container layer. It is not necessary to move the container layer horizontally during the lifting and lowering. In the depalletizing operation, a pallet containing a layer of empty containers is moved beneath the gripping, restraining, and lifting system in the primary palletizer main frame, and then the layer of containers is gripped, restrained, and lifted, the empty pallet is moved out of the palletizer main frame, and then the layer of containers is lowered onto a carrying surface, and from there it is transported out of the main palletizing frame by means of a transport system.

In addition to the stationary palletizer main frame, which contains means for gripping, restraining, and lifting or lowering the layer of containers, the proposed apparatus has a double shuttle carriage, which can be moved perpendicular to the transport systems through the palletizer main frame on conveyor rails. This carriage consists of two cars, which are permanently connected to one another, each bearing a carrying surface. The first car can either be positioned alternatively on a preparation station upstream from the end of the transport system for supplying filled containers, or it may be positioned elsewhere in a gripping and lifting position in the palletizing main frame. The second car is compelled to alternate between the gripping/lifting position in the palletizing main frame and an empty pallet position provided elsewhere upstream from the end of the transport system for removing pallets that carry a layer of filled containers.

The process and apparatus for performing the process are suitable for palletizing filled containers or depalletizing empty containers. In addition, both of these measures can be performed in alternation in a preferred embodiment of the apparatus, whereby the same means for gripping, restraining, or lifting and lowering the container layer are used in a single location, namely the palletizer main frame. The pallets freed up upon depalletizing can be used in the palletizing operation.

BRIEF DESCRIPTION OF THE DRAWINGS

Two examples of the invention are shown in the drawing and described briefly below wherein.

DETAILED DESCRIPTION OF THE PREFERRED EMBODIMENTS

Figure 1:
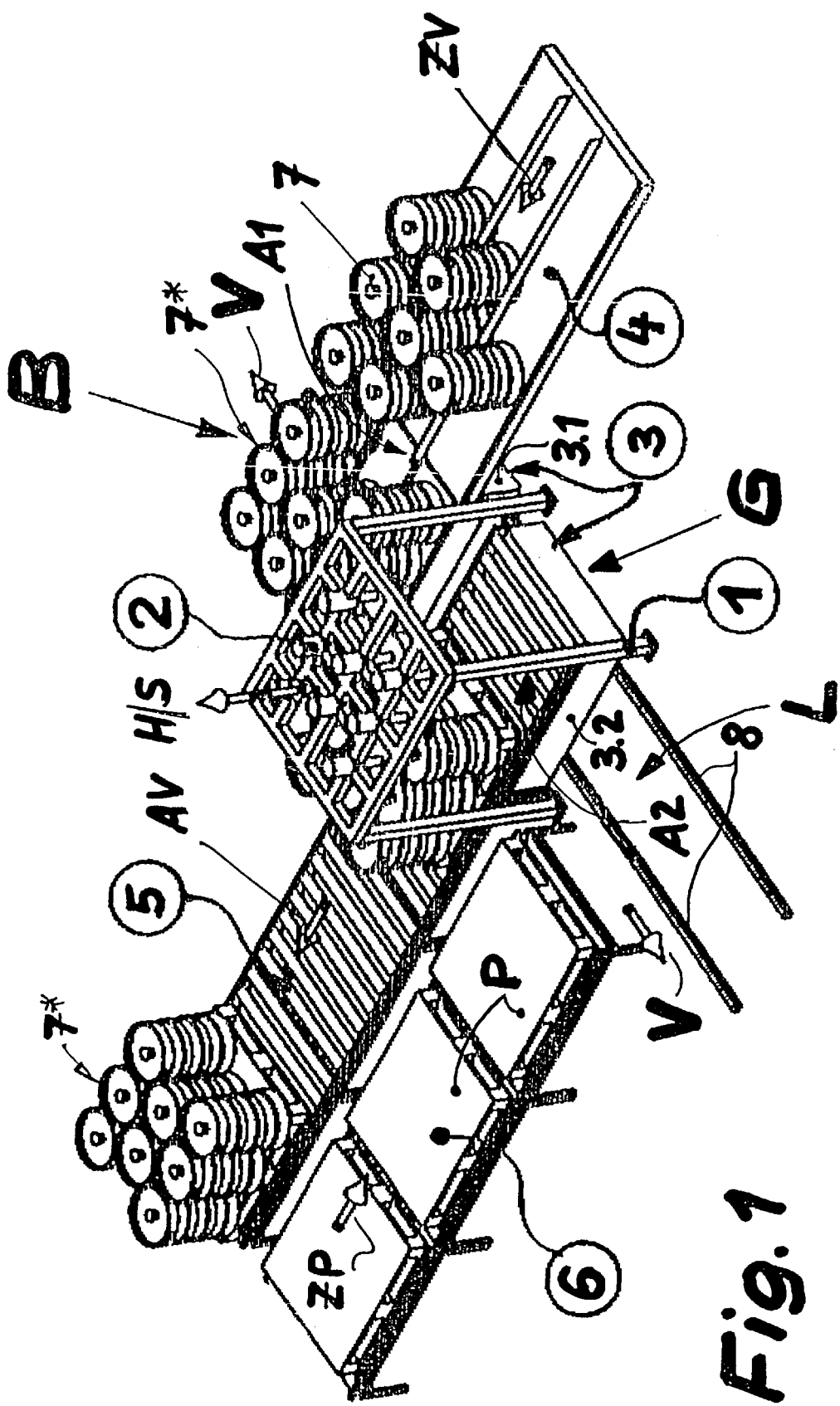
FIG. 1 is an apparatus for palletizing containers on a load carrier (pallet) or for depalletizing containers on such a pallet.

The apparatus (FIG. 1) comprises a stationary palletizer main frame 1, which in its upper area possesses means 2 for gripping, restraining, and lifting or lowering containers 7 or a layer of containers 7*. On conveyor rails 8 a double shuttle carriage 3 having a first car 3.1 and a second car 3.2 permanently connected to said first car can be moved in such a way (movement V) that the second car 3.2 can be positioned under the means 2 in the palletizer main frame 1 while the first car 3.1 occupies a preparation station B on the other side of the palletizer main frame 1. In an alternating position, the second car 3.2 of the double shuttle carriage 3 occupies an empty-pallet position L on the side of the palletizer main frame 1 opposite the preparation station B, while the first car 3.1, which was previously positioned at preparation station B is now positioned under the means 2. The first car 3.1 has a carrying surface A1 for a layer of containers 7\*  comprising filled containers 7, and with a carrying surface A2 carried by a second car 3.2, empty pallets P are either moved from the empty-pallet position L to the gripping and lifting position G (palletizing) or in the reverse direction (depalletizing).

Three transport systems, 4, 5 and 6, which are parallel to each other, are used to load the double shuttle carriage 3 with its two carrying surfaces A1 and A2. Transport system 4 is provided for the supplying ZV of filled containers 7; transport system 5 is provided for the removal AV of pallets P loaded with a container layer 7\* of filled containers 7; and transport system 6 is provided for supplying ZL empty pallets P. The center transport system—transport system 5—terminates in the palletizer main frame 1. Transport system 6 is located next to transport system 5, terminating at the same height as the latter, outside the palletizer main frame. Transport system 4 leads to the palletizer main frame 1 from the direction opposite to that of transport system 6, and it terminates outside the palletizer main frame at a distance corresponding to that of transport system 6.

The transport equipment in transport systems 4, 5, and 6 must be adapted to meet the prevailing conditions and requirements. The apparatus shown in the drawing is used to palletize filled containers 7. When empty containers 7 are depalletized, the transport direction in transport systems 4, 5, and 6 must be reversed. In this case, the pallets P holding the empty layer of containers 7\* are supplied to the palletizer main frame 1 via transport system 5. In the palletizer main frame 1, the container layer 7\* is lifted by the means 2, the empty pallet P is moved from the gripping and lifting position G by the second car 3.2 into the empty-pallet position L, and from there it is taken away by transport system 6. In the position of the double shuttle carriage 3 just referred to, the second car 3.1 is in the gripping and lifting position G so that the empty container layer 7\* can be lowered unto its carrying surface A1 (lower S) and the empty container layer 7\* can then be moved onto the preparation station B upstream from the end of transportation system 4 by means of movement V. From there, the empty containers 7 are carried away in the reverse direction from that shown in FIG. 1 as part of the description of the palletizing operation.

We shall now briefly describe the steps in the palletizing operation. In its home position, the double shuttle carriage 3 is disposed in such a way that its first car 3.1 is located on the preparation station B ahead of transport system 4 for the supply of filled containers ZV, and its second car 3.2 stands beneath the means 2 for gripping, restraining and lifting or lower the container layer 7\* in the stationary palletizer main frame 1. A layer of containers 7\*, for example, in a 6- or 8-container arrangement, is now prepared on carrying surface A1 at preparation station B. After the operation to load the containers 7 to produce the container layer 7\* is completed, the double shuttle carriage 3 travels in such a way that the container layer 7\* moves from the preparation station B to a position beneath the means 2 in the palletizer main frame 1 and the second car 3.2 having carrying surface A2, which was previously positioned under the means 2, is moved to the empty-pallet position L. At this time, the means 2 grasp the entire container layer 7\*, restrain it, and lift it with a short stroke (lifting H in the gripping and lifting position G). When the double shuttle carriage 3 is in this position, an empty pallet P can be moved by the transport system 6 for feeding in ZP empty pallets P to carrying surface A2 of the second car 3.2, which is located in the empty-pallet position L. Finally, the double shuttle car 3 is moved to its home position, so that the empty pallet P moves under the lifted container layer 7\*. The means 2 now lower the container layer 7\* onto the empty pallet P (lowering S in the gripping and lifting position G), and finally, the pallet containing the container layer 7\* is carried out by the transport system 5 for discharging the full containers AV from the palletizer main frame 1. During the process for lowering and carrying away the pallet P holding a container layer 7\*, the carrying surface A1 of the first car 3.1 of the double shuttle carriage 3 can have a new container layer 7\*—supplied by transport system 4—loaded onto it at preparation station B.

Depalletizing takes place by reversing the individual operations referred to above mutatis mutandis, whereby as already explained, the transport direction of transport systems 4, 5, and 6 must be reversed.

Figure 2:
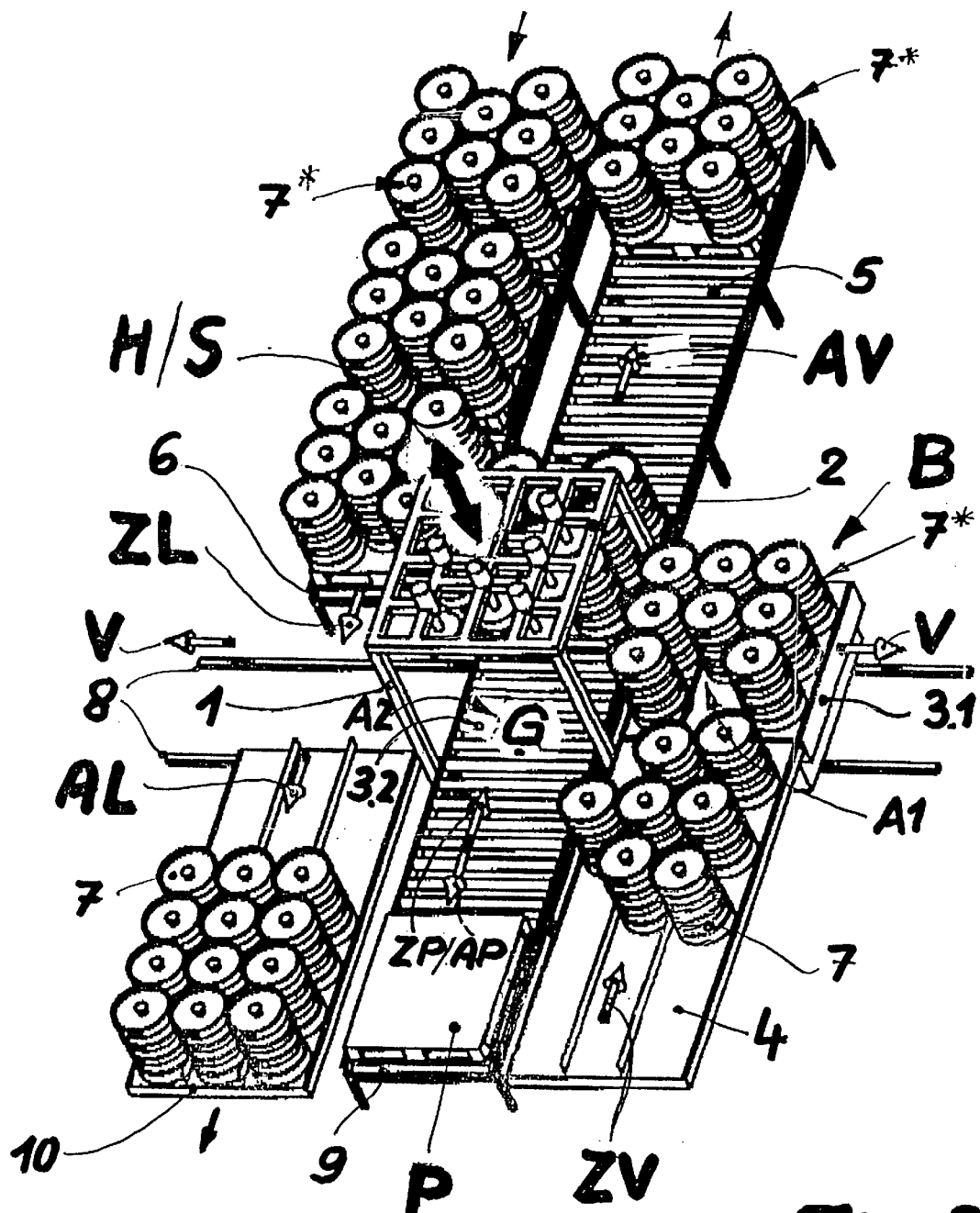
FIG. 2 is a second apparatus, essentially that already familiar from FIG. 1, that can be used to palletize containers onto a load carrier and in alternation to depalletize containers from a load carrier, both occurring at the same time in parallel.

In reference to an enhanced apparatus based on the apparatus of FIG. 1, FIG. 2 shows the steps in a preferred process in which palletizing and depalletizing can be performed in alternation but parallel in time. The filled containers 7 are supplied via the transport system 4 for feeding in the full containers ZV, and, in the same manner as with the apparatus of FIG. 1, they are taken away by the transport system 5 for removing the full containers AV. Transport system 6, which in FIG. 1 is used to supply (palletizing) or remove (depalletizing) empty pallets, now supplies pallets P, each containing a container layer 7\* of empty containers 7 (empty container supply). Transport system 5 and transport system 6 are continued, each on the opposite side of the palletizer main frame 1, interrupted by the dimensions of the double shuttle carriage 3 provided transverse to conveying direction V, which has a first car 3.1 and a second car 3.2, in a transport system 9 for supplying (ZP) or removing (AP) empty pallets P, or in a transport system 10 for removing empty containers 7.

If, for example in order to palletize a container layer 7\*, transport system 4 is used to supply filled containers ZV to preparation station B, the carrying surface A1 of the first car, 3.1, of the double shuttle carriage 3 can move this container layer 7\* to a position beneath the means 2 in the palletizer main frame 1. The container layer 7\* is then gripped, restrained, and lifted (lifting H in the gripping and lifting position G), so that the empty pallet P can be supplied by transport system 9 for supplying ZP empty pallets P, and so that it can be moved under the lifted container layer 7\*. The container layer 7\* is then lowered (loading S) in the gripping and lifting position G, and the loaded pallet is transported out by the transport system 5 for removing the filled containers from the palletizer main frame 1.

During the lifting and lowering (H/S) of the container layer 7\* in the palletizer main frame 1, the second car (3.2) of the double shuttle carriage 3 is located between transport systems 6 and 10, which are used to supply the empty containers ZL or to remove the filled containers AL, and which terminate at the shuttle rails 8, so that a pallet P loaded with a container layer 7\* of empty containers 7 can temporarily be moved onto the carrying surface A2 of the second car 3.2 of the double-shuttle carriage 3. The double-shuttle carriage 3 is now moved via shuttle movement V into the alternative position after a pallet loaded with a container layer 7\* of filled container 7 is transported out of the palletizer main frame 1 by transport system 5, so that the means 2 can grip, restrain, and lift the empty container layer 7\* in the gripping and lifting position G. The empty pallet P is then removed via transport system 9 for removing AP empty pallets P from the palletizer main frame 1, so that the means 2 can now lower the container layer 7* directly onto the carrying surface of the second car 3.2, which then transports it to the position between transport system 6, the empty container feed ZL, and transport system 10, the empty container removal AL. From there they are carried away by transport system 10.

Palletizing and depalletizing take place in mutual alternation in the manner described above, both operations being carried out with a single double-shuttle carriage 3, a single palletizer main frame 1, and the means 2 provided therein for gripping, restraining, and lifting or lowering.

The above descriptions of the figures include the essential steps of the proposed processes. The apparatus for performing the processes may be physically embodied in a multitude of ways. FIGS. 1 and 2 merely provide examples of possible embodiments of the general concept of the invention.

What is claimed is:

1. An apparatus for palletizing containers, in particular drums, kegs, or other essentially cylindrical or barrel-shaped containers, on a load carrier, and/or depalletizing said containers, said apparatus comprising a first transport system for supplying or removing filled containers (7), a second transport system for removing or supplying loader carriers each loaded with a container layer (7*) of filled containers (7), and a third transport system for supplying or removing empty pallets (P), and comprising a stationary palletizer main frame (1) having vertical transfer means (2) whose height is adjustable for gripping and restraining the container layer (7*), wherein the first, second and third transport systems are disposed parallel to each other, said second transport system disposed between said first and third transport systems, the second transport system (5) terminating in the main frame (1), the third transport system positioned adjacent to the second transport system (5) at the same height as the second transport system (5) and terminating outside the palletizer main frame (1), and the first transport system extending to the palletizer main frame (1) from the direction opposite that of the third transport system, and terminating outside the palletizer main frame (1) at a distance corresponding to that of the third transport system (6);

a double shuttle carriage (3: 3.1, 3.2) movable transversely to said first, second and third transport systems (4, 5, 6) on conveyor rails (8) through the palletizer main frame (1), and said carriage having a first car (3.1) that has a first carrying surface (A1) and is alternately positioned either on a preparation station (B) upstream from the end of said first transport system (4), or otherwise in a gripping and lifting position (G) in the palletizer main frame (1), and the carriage having a second car (3.2) that is permanently connected to the first car (3.1) and is alternately and unavoidably positioned either in the gripping and lifting position (G) or otherwise in an empty-pallet position (L) upstream from the end of the second transport system (5), and wherein the vertical transfer means (2) lift and lower the given gripped and restrained container layer (7*).

2. The apparatus of claim 1, wherein the second transport system (5) and third transport system (6), are each on the opposite side of the palletizer main frame (1), and each interrupted by the dimensions of the double shuttle carriage (3; 3.1, 3.2) which moves in a conveying direction V and are respectively continuous with a transport system (9) for supplying (ZP) or removing (AP) empty pallets (P), and with a transport system (10) for removing (AL) empty containers (7).

* * * * *